United States Patent [19]

Batlaw et al.

[11] Patent Number: 5,389,130
[45] Date of Patent: Feb. 14, 1995

[54] PRINTING INK EMULSION HAVING REDUCED VOC

[75] Inventors: Rajnish Batlaw, Spartanburg; Patrick D. Moore, Pacolet, both of S.C.

[73] Assignee: Milliken Research Corporation, Spartanburg, S.C.

[21] Appl. No.: 83,737

[22] Filed: Jun. 25, 1993

[51] Int. Cl.⁶ .............................................. C09D 11/02
[52] U.S. Cl. .................... 106/20 R; 106/28 R; 106/30 R
[58] Field of Search ............... 106/20 R, 22 R, 22 E, 106/28 R, 30 R

[56] References Cited

U.S. PATENT DOCUMENTS

| | | | |
|---|---|---|---|
| 3,694,238 | 9/1972 | Tinghitella et al. | 106/30 |
| 3,825,431 | 7/1974 | Uhl et al. | 106/20 |
| 3,948,668 | 4/1976 | Hayek et al. | 106/22 |
| 4,104,219 | 8/1978 | Peters et al. | 260/29.6 |
| 4,253,397 | 3/1981 | Emmons et al. | 101/450.1 |
| 4,255,196 | 3/1981 | Emmons et al. | 106/29 |
| 4,402,262 | 9/1983 | Handforth | 101/129 |
| 4,543,102 | 9/1985 | Défago et al. | 8/471 |
| 4,692,188 | 9/1987 | Ober et al. | 106/23 |
| 4,840,674 | 6/1989 | Schwarz | 106/22 |
| 4,963,188 | 10/1990 | Parker | 106/20 |
| 4,981,517 | 1/1991 | DeSanto, Jr. et al. | 106/28 |
| 5,098,478 | 3/1992 | Krishnan et al. | 106/23 |
| 5,104,449 | 4/1992 | Pavlin | 106/30 R |
| 5,158,606 | 10/1992 | Carlick et al. | 524/145 |

FOREIGN PATENT DOCUMENTS 4-288375  10/1992  Japan ................ C09D 11/10

Primary Examiner—Helene Klemanski
Attorney, Agent, or Firm—Terry T. Moyer; Timothy J. Monahan

[57] ABSTRACT

An ink composition for Gravure printing is provided wherein the vehicle is a water-in-oil emulsion of a water immiscible organic phase and an aqueous phase, in the range of 9:1 to 1:1, thereby significantly reducing VOC emissions, with no detrimental effect on print quality.

32 Claims, 1 Drawing Sheet

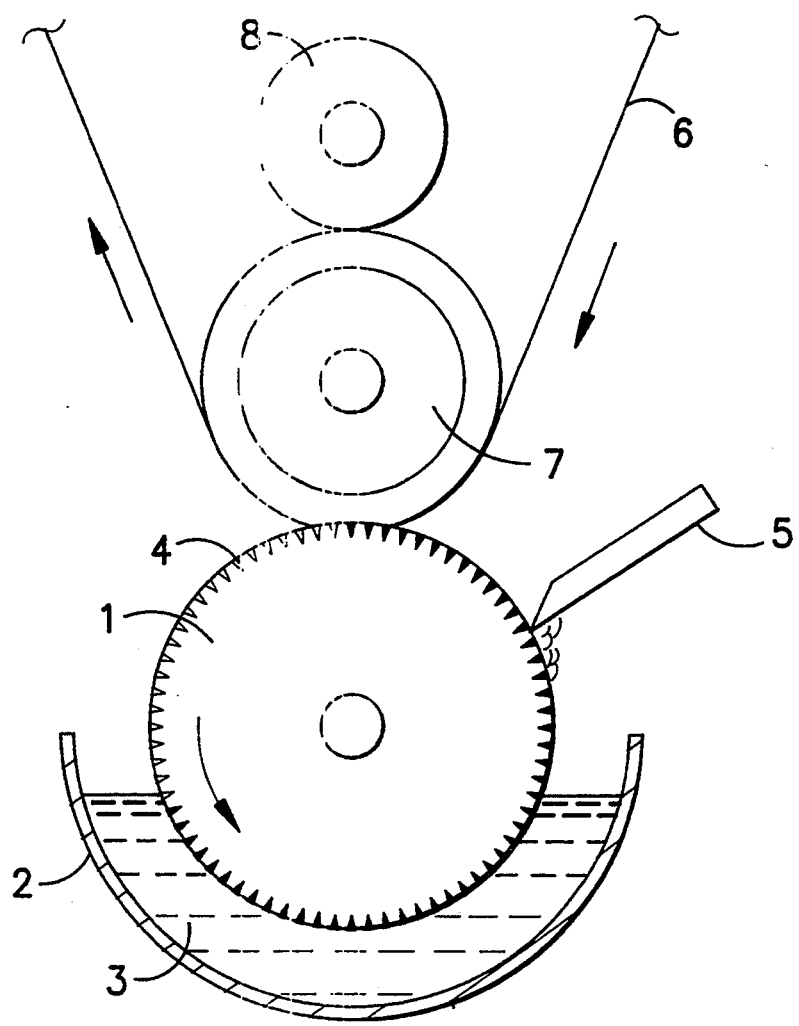

PRINTING INK EMULSION HAVING REDUCED VOC

BACKGROUND OF THE INVENTION

This invention relates to a printing ink suitable for publication gravure printing having a substantial portion of organic solvent replaced with water, the physical form of the ink being an organic solvent and water emulsion.

Inks consist of a colorant and a liquid vehicle, in which the colorant is dispersed or dissolved. After the ink is applied, a binder present in the vehicle adheres the colorant to the substrate on which it is printed. The binder may be a drying oil which oxidizes and is converted from a liquid to a solid film, or a resin dissolved or dispersed in a solvent, which forms a solid film binding the colorant to a substrate after the solvent is evaporated. Combinations of drying oils, resins and organic solvents are also employed.

The solvents used in gravure printing are primarily aromatic, aliphatic and naphthenic hydrocarbons. Additional organic solvents useful in gravure printing include alcohols, ketones, esters, ethers and halogenated compounds. Important criteria in solvent selection are solvent strength relative to a desired resin, evaporation rate, viscosity, cost, odor and toxicity, and compatibility with the substrate to be printed upon. Occasionally, small amounts of water, less than 5 wt. %, usually about 2 wt. %, are added to gravure inks to overcome printing problems.

Since the solvent typically constitutes from 30 to 70 wt. % of a gravure ink composition, the emission of volatile organic compounds (VOC) represents a significant environmental concern. In order to comply with myriad federal, state and local environmental regulations, gravure printers have been required to install solvent recovery systems. The systems represent both a substantial capital outlay and operating expense, and can limit production rates. Losses of organic solvent to the atmosphere also represent raw material make up expense.

Water based inks have been developed to avoid the environmental impact and operating expenses associated with organic solvents and, in some cases, reduce raw material costs. Water dispersible or soluble binders, such as polyacrylic acid and polymethacrylic acid, may be employed, as well as water miscible co-solvents. In Peters et al., U.S. Pat. No. 4,104,219, a polyalkyl acrylate binder is dispersed in a homogenous, aqueous phase. Defago et al., U.S. Pat. No. 4,543,102, disclose an aqueous ink composition having up to 8% of a water immiscible organic solvent, which contains polyvinyl alcohol and an acrylic polymer or copolymer.

A method of preparing an aqueous ink for ink jet printing is described in Ober et al., U.S. Pat. No. 4,692,188, comprising the steps of:
1. dissolving a polymer, such as polystyrene or polyester, and an oil soluble dye in a water immiscible solvent, such as methylene chloride;
2. adding an aqueous phase and a surfactant;
3. forming an emulsion; and
4. evaporating the solvent to form an ink having particles of polymer and dye suspended in the aqueous phase.

All of the water immiscible organic solvent is removed prior to application of the ink to a substrate.

There are a number of drawbacks associated with water-base inks. The press handling characteristics of water-base inks are uniquely different from organic solvent base materials. Once dry, aqueous inks may be reluctant to redissolve in water, depending upon the kind of resin system used in the ink, resulting in an increase in cylinder plugging and number of press wash ups. Conversely, the resin system may not be sufficiently water resistant upon drying, and the ink may be easily smeared in the presence of moisture.

The substrate being printed upon strongly affects the performance of water-based inks. In applications such as printing on low surface tension film and publication gravure employing coated paper, organic solvent systems give superior performance at this time. Even with uncoated paper, water may cause dimensional distortion and curling.

The resin system used in water-based inks can give rise to poor dot spread and increased skipped dots. These problems may be difficult to overcome given the limited availability of resins for use in water-based systems. Accordingly, the adoption of a water-based system may require changes in gravure cylinder engravings, press operating and housekeeping procedures, and at higher press speeds, dryer modifications. The aqueous phase of water-based inks contains many additives such as surfactants and alcohol to reduce surface tension and to stabilize pigment-resin dispersions. Ammonia or other volatile amines are often added to aid in dissolving the resin. The effect of the aforementioned additives must be evaluated and if necessary, compensated for in the printing process.

Printing pastes for screen printing on textiles have been formulated based on oil-in-water emulsions. Uhl et al., U.S. Pat. No. 3,825,431, disclosed defoamers which are particularly useful in such print paste emulsions. A printing ink emulsion for lithographic printing is disclosed by DeSanto, Jr. et al., U.S. Pat. No. 4,981,517. Instead of applying a separate aqueous and oil based ink coat to the printing plate, an emulsion is provided which is applied in a single-application-step process. The emulsion obviates the requirement of a water coat application to the non-image area of a printing plate to render that area ink repellent.

Other uses of emulsions in printing ink formulations are disclosed by Krishnan et al., U.S. Pat. No. 5,098,478 and Carlick et al., U.S. Pat. No. 5,158,606. The rub resistance of an ink may be improved by incorporating an emulsion polymer into the composition. In Krishnan et al., the ink is water-based, whereas Carlick et al. disclose an oil based composition having up to 15 wt. % of an emulsion polymer incorporated therein.

Despite the extensive work in development of water-based ink formulations, there remains a strong need in the gravure printing industry for an ink having reduced VOC, which retains the performance standards of organic solvent based inks.

SUMMARY OF THE INVENTION

Therefore, one of the objects of the invention is to provide a printing ink having reduced VOC emissions.

Another object of the invention is to provide a printing ink useful in the gravure printing process.

Still another object of the invention is to provide an ink which is compatible with a wide variety of substrates.

Further objects of the invention include providing a printing ink which retains the performance characteristics of organic solvent based formulations, an ink which is compatible with standard pigments and resins used in gravure printing, and an ink which is more economical, both from a raw material cost and emission control expense.

Accordingly, an ink composition suitable for gravure printing is provided having a colorant and a vehicle, wherein the vehicle is an emulsion of a water immiscible organic solvent phase and an aqueous phase in a ratio of from 9:1 to 1:3, respectively. Emissions of VOC may be reduced by 10 to 75% employing the present ink composition.

In addition to meeting the aforementioned objectives, the invention has preferred features of a water-in-oil emulsion, resins which are soluble or dispersible in a water immiscible organic solvent phase, and a reduction in VOC emissions of from 5% to 75% relative to standard organic solvent based gravure printing ink compositions. The ink formulation meets the rigid requirements of gravure printing, e.g., tone scale density, gloss, rub resistance, flexibility and adhesion.

BRIEF DESCRIPTION OF THE DRAWING

The drawing is a side schematic view of a portion of a gravure printing apparatus.

DESCRIPTION OF THE PREFERRED EMBODIMENT OF THE INVENTION

Without limiting the scope of the invention, the preferred features are set forth below.

In its broadest sense, the gravure ink composition of the present invention is made up of a colorant and a vehicle. The vehicle is a liquid carrier, which is an emulsion of a water immiscible organic solvent and water. The water replaces a significant portion of the organic compounds in the formula, usually volatile organic solvents, thereby reducing VOC emissions. The vehicle also contains a binder which adheres the colorant to the substrate being printed upon when the ink dries. Surprisingly, the performance of the ink is not appreciably affected by the presence of water, as an emulsion, in the formulation, especially with regard to tone scale density.

The invention is useful with a wide variety of colorants. The most important class of colorants is pigments, and their use in gravure ink compositions is well known to those skilled in the art. By way of example and not limitation, the following pigments may be used and are identified by Colour Index reference in Table 1 below.

TABLE 1

| PIGMENT NO. | C.I. NUMBER | NAME |
| --- | --- | --- |
| Yellow 12 | 21090 | Diarylide AAA |
| Yellow 13 | 21100 | Diarylide AAMX |
| Yellow 14 | 21095 | Diarylide AAOT |
| Yellow 17 | 21105 | Diarylide AAOA |
| Red 3 | 12120 | Toluidine Red |
| Red 49:1 | 15630 | Barium Lithol |
| Red 49:2 | 15630 | Calcium Lithol |
| Red 52:1 | 15860 | BON Calcium |
| Red 53:1 | 15585 | Lake Red C |
| Red 57:1 | 15850 | Rubine 4B |
| Blue 15 | 74160 | Phthalocyanine Blue |
| Blue 16 | 74100 | Phthalo Copper Free |
| Blue 18/56/61 | 42770/42800/42765:1 | Alkali Blue |
| Blue 24 | 42090:1 | Blue Lake |
| Blue 27 | 77510 | Iron Blue |
| Black 7 | 77266 | Carbon Black (Channel, Furnace and Lamp Black) |

TABLE 1-continued

| PIGMENT NO. | C.I. NUMBER | NAME |
| --- | --- | --- |
| White 4 | 77947 | Zinc Oxide |
| White 6 | 77891 | Titanium Dioxide |
| White 18 | 77220 | Calcium Carbonate |
| White 24 | 77002 | Alumina Hydrate |
| White 27 | 77711 | Silica |

For purposes of the description herein, white pigments, clays, opacifiers and other pigment extenders are classified as pigments.

Also within the scope of the present invention are dyestuffs. Suitable dyestuffs include, but are not limited to, Acid Dyes, such as Acid Red 87, C.I. Number 45380, Basic Dyes, such as Basic Violet 10, C.I. Number 45170, and Basic Blue 26, C.I. Number 44045, Solvent Dyes such as Solvent Yellow 19, C.I. Number 13900:1 and Solvent Black 7, C.I. Number 50415:1, and Disperse Dyes, such as Disperse Yellow 3, C.I. Number 11855 and Disperse Red 4, C.I. Number 60755.

The dispersion of pigments and dyestuffs into vehicles using mixing and milling techniques, including in the case of some dyestuffs, dissolution of the colorant into the vehicle, is a well known manufacturing process. It is important to note, however, that since the vehicle is an emulsion containing a water immiscible phase and an aqueous phase, it is advisable to first disperse the colorant in one or the other phase before forming the emulsion. From a practical standpoint, colorant dispersions are available as a line ink, which is a concentrated, stabilized dispersion of the colorant in a water immiscible organic phase, typically a resin dissolved or dispersed in an organic solvent; the latter is generally referred to as a solution resinate or varnish. The line ink may be blended with additional varnish, organic solvent, and miscellaneous performance enhancing additives before it is mixed with the desired amount of water to form an emulsion.

The vehicle for the colorant is an emulsion of a water immiscible organic phase and an aqueous phase, and also includes a binder. Generally binders are resins described as non-crystalline solid materials, or liquids of a relatively high molecular weight, which adhere the colorant to a substrate when the ink dries. There are a wide variety of commercially available resins, and their selection and use is well known to practitioners in the field.

By way of example and not limitation, the following resins and mixtures thereof may be incorporated into the ink formulation:

rosin and modified rosins, such as calcium, magnesium and zinc metallic resinates, ester gum of rosin, maleic resins and esters, dimerized and polymerized rosins and rosin modified fumaric resins; shellac, asphalts, phenolic resins and rosin-modified phenolic resins; alkyd resins; polystyrene resins and copolymers thereof; terpene resins; alkylated urea formaldehyde resins; alkylated melamine formaldehyde resins; polyamide resins; polyimide resins; vinyl resins, such as polyvinyl acetate and polyvinyl alcohol; ketone resins; acrylic resins, such as polyacrylic acid and polymethacrylic acid; epoxide resins; polyurethane resins; cellulosic resins, such as nitro cellulose, ethyl cellulose, cellulose acetate butyrate and carboxymethyl cellulose.

The vehicle may also include a non-drying oil like Magie Oil 52, or a semi-drying oil or drying oil, such as linseed oil, Tung oil and oiticica oil, as a binder. These oils undergo oxidative polymerization upon drying to form an adhesive film for the colorant. Typically, these oils are provided in a modified form to enhance their drying time and film forming properties. Modification generally includes heat polymerization to form cyclic, dimers, trimers and some higher order polymers.

The resin may be soluble or dispersible in either the water immiscible phase or aqueous phase of the emulsion, depending on the resins hydrophobic/hydrophilic character. In a preferred embodiment, the resin is soluble in the water immiscible phase.

Appreciable reductions in VOC emissions may be realized with ratios of the water immiscible organic solvent phase to the aqueous phase as high as 19:1. More significant VOC reductions are achieved with ratios of the organic solvent phase to aqueous phase in the range of 9:1 to 1:3; preferably 9:1 to 1:1. Organic solvent reductions in the range of 4:1 to 1.1:1, preferably 3:1 to 1.5:1 are believed to represent optimizations of solvent reduction and printing ink performance. The weight ratios are calculated on a total solvent basis. Preferably, the emulsion is a water-in-oil emulsion.

Any of a large number of organic solvents, alone or in combination, may constitute the water immiscible phase of the emulsion. By way of example, the organic solvent may be selected from aliphatic, naphthenic and aromatic hydrocarbons, water immiscible alcohols, ketones, ethers and esters, drying and semi-drying oils, and halogenated organic solvents. Preferred organic solvents include:

(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acid having a boiling point from 65° to 175° C.;
(iv) ketones having a boiling point from 75° to 180° C.;
(v) alcohols having a boiling point from 100° to 260° C.;
(vi) ethers having a boiling point from 100° to 210° C.;
(vii) any of the organic solvents from groups (i) to (vi) above substituted with from 1 to 4 chloro or bromo substituents, and which have a boiling point of from 40° to 100° C.; and
(viii) drying and semi-drying oils Except for drying oils listed above, preferably the organic solvents are $C_3$ to $C_{40}$ compounds. The water immiscible organic solvents have a solubility of less than one part per 100 parts of water.

By way of example, not limitation, specific examples of organic solvents include toluene, xylene, $C_5$ to $C_{40}$ aliphatic and cycloaliphatic hydrocarbons, 1,1,1-trichloroethane, methylene chloride. Tradenames for commercially available solvents include Textile Spirits TM, Lactol Spirits TM, Lacolene TM, Rotosolve TM, and VM&P Naphtha.

The aqueous phase of the vehicle may also include minor amounts of water miscible, organic solvents, such as methanol, without deviating from the performance of the ink composition.

The water immiscible phase may be emulsified with the aqueous phase in the aforementioned ratios by pumping the components together in the well of a standard gravure printing press for approximately five (5) minutes. Emulsifiers, such as nonionic surfactants, may be added to increase the stability of the emulsion. Generally, the emulsion will remain stable during printing by circulation of the ink composition in the printing well and, optionally, the pan in which the engraved gravure roll is immersed during the printing process. Alternatively, propeller mixers may be inserted into the well to increase agitation and ensure a uniform distribution of the components in the ink composition.

It is also well known in the art to incorporate miscellaneous additives into the ink composition to enhance performance with regard to gloss, rub resistance, flexibility, uniform density of the print, flexibility and adhesion.

These additives include plasticisers such as sucrose acetate iso-butyrate, triethyl citrate, and epoxidised soy bean oil, and waxes such as polyethylene waxes, halogenated hydrocarbon waxes and fatty acid amides. In lesser amounts, additives such as surfactants, defoaming agents, catalysts, antioxidants, corrosion inhibition, biocides and deodorants may be incorporated into the ink composition.

Ink compositions may be made according to the present invention having the following components:
(a) 2-25 parts colorant;
(b) 5-35 parts resins;
(c) 50-93 parts emulsion (resin-free basis); and
(d) up to 15 parts miscellaneous additives.

In a preferred embodiment, the ink has the following composition:
(a) 3-20 parts colorant;
(b) 7-30 parts resin;
(c) 60-90 parts emulsion (resin-free basis); and
(d) up to 12 parts miscellaneous additives.

The viscosity of the ink composition when used for gravure printing is generally between 14 seconds and 90 seconds by Shell Cup #2, preferably between 16 seconds and 50 seconds (the word "seconds" shall hereinafter be referred to as "s"). These inks can be used at temperatures ranging from 20° C. to 75° C. The viscosity requirements of Gravure inks dramatically distinguish them from paste-like inks, such as lithographic inks.

Referring to the drawing, an engraved gravure roll 1 is partially immersed in pan 2 filled with ink 3. As gravure roll 1 rotates, cells 4 pick up ink 3. Doctor blade 5 scrapes excess ink from the unengraved areas. A substrate such as paper 6 is fed between impression roller 7 and gravure roll 1, transferring ink 3 from cell 4 to the substrate. Backing roller 8 supports impression roller 7.

The invention may be further understood by reference to the following examples, but the invention is not to be construed as being unduly limited thereby. Unless otherwise indicated, all parts and percentages are by weight.

All of the line inks and extender varnish used in Examples 1-17 were obtained from Flint Ink Corporation, Detroit, Mich., U.S.A.

The following examples were printed on a gravure press (Cerutti, Model Number RB 116 Proof Press). The printing speed was approximately 300 to 330 feet per second. The following examples demonstrate use of the ink composition for gravure printing on a coated paper.

EXAMPLE 1

(Standard)

40.2 parts of a black line ink, DS-441, was added to the ink fountain on the Cerutti Proof Press. Next, 33.5 parts of extender varnish, DS-914, and 26.3 parts of toluene were added to the formula. The mixture was circulated through the ink fountain of the press, using the circulation pump, for approximately five minutes. The ink composition was used to print monotone black on 40 lb., coated paper.

EXAMPLE 2

34.5 parts of black line ink, DS-441, was added to the ink fountain of the Cerutti Proof Press. Next, 28.7 parts of extender varnish, DS-914, 29.4 parts of toluene and 7.4 parts of water were added to the fountain. The mixture was emulsified, using the press circulation pump, by circulating approximately five minutes. The ink composition was used to print monotone black on 40 lb., coated paper.

EXAMPLE 3

An ink composition was prepared according to Example 2, except that 17.1 parts of toluene and 12.4 parts of water were added to the mixture. The ink composition was used to print monotone black on 40 lb., coated paper.

EXAMPLE 4

An ink composition was prepared according to Example 2, except that 18.0 parts of toluene and 27.0 parts of water were added to the mixture. The ink composition was used to print monotone black on 40 lb., coated paper.

EXAMPLE 5

An ink composition was prepared according to Example 2, except that 7.18 parts of toluene and 37.6 parts of water were added to the mixture. The ink composition was used to print monotone black on 40 lb., coated paper.

The composition of the ink formulations of Examples 1-5 are summarized below based upon weight percentages of dry pigment, dry resin, water immiscible organic solvent, water and miscellaneous additives. The resin was a rosin-based, metal resinate and the organic solvent is substantially toluene or mixtures of toluene and xylene.

TABLE 1

| EXAMPLE | % PIGMENT | % RESIN | % ORGANIC SOLVENT | % WATER | % ADDITIVES |
|---|---|---|---|---|---|
| 1 | 11.4 | 15.9 | 71.5 | 0 | 1.2 |
| 2 | 9.8 | 13.6 | 67.8 | 7.4 | 1.0 |
| 3 | 10.9 | 15.2 | 60.4 | 12.4 | 1.2 |
| 4 | 8.5 | 11.8 | 51.7 | 27.0 | 0.9 |
| 5 | 8.5 | 11.9 | 41.0 | 37.6 | 0.9 |

Tonal densities of the printed ink were evaluated using an X-Rite, Inc. 938 model spectrodensitometer and the results are summarized below in Table 2.

TABLE 2

| EXAMPLE | Tonal Density 100 | 75 | 50 | 25 |
|---|---|---|---|---|
| 1 | 1.340 | 0.818 | 0.540 | 0.273 |
| 2 | 1.454 | 0.850 | 0.514 | 0.248 |
| 3 | 1.376 | 0.823 | 0.505 | 0.250 |
| 4 | 1.288 | 0.720 | 0.389 | 0.204 |
| 5 | 1.214 | 0.564 | 0.317 | 0.169 |

The following examples demonstrate use of the ink composition for gravure printing on uncoated paper.

EXAMPLE 6

(Standard)

40.8 parts of a black line ink, DS-442, was added to the ink fountain of the Cerutti Proof Press. Next, 33.8 parts of extender varnish, DS-914, and 25.3 parts of toluene were added. The ink composition was used to print monotone black on 30 lb., uncoated paper.

EXAMPLE 7

30.1 parts of a black line ink, DS-442, was added to the ink fountain of the Cerutti Proof Press. Next, 25.1 parts of extender varnish, DS-914, 18.1 parts of toluene and 27.1 parts of water were added, to the mixture, respectively. The ink mixture was emulsified, using the press circulation pump, for approximately five minutes. The ink composition was used to print monotone black on 30 lb., uncoated paper.

EXAMPLE 8

An ink composition was made according to Example 7 except that 22.7 parts of toluene and 8.1 parts of water were used. The ink composition was used to print monotone black on 30 lb., uncoated paper.

The calculated ink formulations of Examples 6-8 and the tonal density measurements of the printed ink on uncoated paper are summarized in Tables 3 and 4 below, respectively.

TABLE 3

| EXAMPLE | % PIGMENT | % RESIN | % ORGANIC SOLVENT | % WATER | % ADDITIVES |
|---|---|---|---|---|---|
| 6 | 17.4 | 10.2 | 71.1 | 0 | 1.2 |
| 7 | 12.9 | 7.6 | 52.0 | 27.1 | 0.9 |
| 8 | 16.1 | 9.5 | 65.1 | 8.1 | 1.1 |

TABLE 4

| EXAMPLE | Tonal Density 100 | 75 | 50 | 25 |
|---|---|---|---|---|
| 6 | 1.342 | 0.817 | 0.542 | 0.273 |
| 7 | 1.308 | 0.816 | 0.532 | 0.281 |
| 8 | 1.213 | 0.748 | 0.479 | 0.265 |

The following examples were also printed on the Cerutti Model 872 gravure proof press, but with a yellow ink composition.

EXAMPLE 9

4 parts of a yellow line ink, DS-861, was added to the ink fountain of the Cerutti Proof Press. Next, 3.2 parts of extender varnish, DS-914, 3.7 parts of toluene, and 1.2 parts of water were added. The mixture was allowed to emulsify, using the press circulation pump, for approximately five minutes. The ink composition was used to print monotone yellow on 34 lb., coated paper.

EXAMPLE 10

An ink composition was prepared according to Example 9 except that 3.2 parts of toluene and 1.5 parts of water were added. The ink composition was used to print monotone yellow on 34 lb., coated paper.

EXAMPLE 11

An ink composition was made according to Example 9 except that 2.8 parts of toluene and 1.7 parts of water were used. The ink composition was used to print monotone yellow on 34 lb., coated paper.

was used to print monotone yellow on 34 lb., coated paper.

EXAMPLE 13

4.3 parts of water, 0.22 parts of toluene, 2.5 parts of extender varnish, DS-914, and 3.0 parts of yellow line ink, DS-861, were added to an eight ounce jar. The jar was vigorously shaken to ensure complete mixing. The ink composition was used to print monotone yellow on 34 lb., coated paper.

EXAMPLE 14

An ink composition was prepared according to Example 13, except that 4.3 parts of water and 0.45 parts of toluene were used. The ink composition was used to print monotone yellow on 34 lb., coated paper.

EXAMPLE 15

An ink composition was prepared according to Example 13 except that 4.3 parts of water and 0.67 parts of toluene were used. The ink composition was used to print monotone yellow on 34 lb., coated paper.

The ink formulations of Examples 12–15 are summarized below in Table 7.

TABLE 7

| | Ink Composition | | | | |
|---|---|---|---|---|---|
| EXAMPLE | % PIGMENT | % RESIN | % ORGANIC SOLVENT | % WATER | % ADDITIVES |
| 12 | 5.4 | 11.3 | 81.4 | 0 | 1.8 |
| 13 | 4.8 | 13.1 | 37.0 | 42.9 | 2.1 |
| 14 | 4.7 | 13.1 | 38.4 | 42.0 | 2.0 |
| 15 | 4.6 | 12.5 | 39.6 | 41.0 | 2.0 |

The ink formulations of Examples 9–11 are summarized below in Table 5.

TABLE 5

| | Ink Composition | | | | |
|---|---|---|---|---|---|
| EXAMPLE | % PIGMENT | % RESIN | % ORGANIC SOLVENT | % WATER | % ADDITIVES |
| 9 | 5.3 | 12.6 | 69.6 | 10.1 | 2.4 |
| 10 | 5.4 | 12.8 | 66.5 | 12.9 | 2.4 |
| 11 | 5.5 | 13.0 | 64.2 | 14.8 | 2.4 |

The printed ink was evaluated for tonal density as identified above, and the results are summarized in Table 6 below.

TABLE 6

| | Tonal Density | | | | |
|---|---|---|---|---|---|
| EXAMPLE | 100 | 75 | 50 | 25 | 5 |
| 9 | 1.17 | 0.78 | 0.45 | 0.21 | 0.03 |
| 10 | 1.17 | 0.77 | 0.42 | 0.20 | 0.04 |
| 11 | 1.16 | 0.74 | 0.40 | 0.20 | 0.04 |

The ink compositions of the remaining examples were prepared in the laboratory and printed on a K-Proofer, Model Number K.C.C. 101 available from RK Print Coat Instruments Ltd., bench scale printer which simulates gravure printing.

EXAMPLE 12

(Standard)

4.9 parts of toluene, 2.5 parts of extender varnish, DS-914, and 3.0 parts of yellow line ink, DS-861, were added to an eight ounce jar. The jar was vigorously shaken to ensure emulsification. The ink composition Tonal densities were measured on a spectrodensitometer according to the procedures set forth above and are summarized below in Table 8.

TABLE 8

| | Tonal Density | | | | |
|---|---|---|---|---|---|
| EXAMPLE | 100 | 75 | 50 | 25 | 5 |
| 12 | 1.18 | 0.81 | 0.52 | 0.22 | 0.04 |
| 13 | 1.16 | 0.74 | 0.40 | 0.20 | 0.04 |
| 14 | 1.16 | 0.74 | 0.39 | 0.19 | 0.04 |
| 15 | 1.15 | 0.73 | 0.39 | 0.19 | 0.03 |

The following examples demonstrate the use of a water immiscible organic solvent containing a substantial portion of aliphatic hydrocarbons, i.e., the organic solvent is 25.3% Magie Oil in Example 16 and 19.8% Magie Oil in Example 17 (see Example 16 for composition of Magie Oil).

EXAMPLE 16

5.2 parts of a yellow line ink, DS-861, 1.3 parts of extender varnish, DS-914, 2.1 parts of water and 1.4 parts of Magie Oil 52, available from Magie Brothers —Penzoil Products Co., 9101 Fullerton Avenue, Franklin Park, Ill. 60131-1089, were added to an eight ounce jar. Magie Oil 52 is a hydrocarbon solvent having the following characteristics: aromatics, <1%, olefins <1%, liquid paraffins 100%, initial/50%/final boiling points of 520°/540°/580° F., respectively. The mixture was vigorously shaken to ensure complete mixing. The ink composition was used to print monotone yellow on 34 lb., coated paper.

EXAMPLE 17

An ink composition was prepared and printed according to Example 16 except that 1.9 parts of water, 1.2 parts of toluene, and 1.2 parts of Magie Oil 52 were used.

The ink composition for Examples 17–18 and tonal densities on the printed ink are summarized below in Tables 9 and 10, respectively.

TABLE 9

| | | Ink Composition | | |
|---|---|---|---|---|
| EXAMPLE | % PIGMENT | % RESIN | % ORGANIC SOLVENT | % WATER | % ADDITIVES |
| 16 | 3.9 | 16.2 | 55.3 | 21.0 | 3.6 |
| 17 | 3.5 | 14.3 | 60.2 | 18.8 | 3.2 |

TABLE 10

| | Tonal Density | | | | |
|---|---|---|---|---|---|
| EXAMPLE | 100 | 75 | 50 | 25 | 5 |
| 16 | 1.17 | 0.80 | 0.47 | 0.22 | 0.04 |
| 17 | 1.17 | 0.79 | 0.43 | 0.21 | 0.04 |

The print of Examples 1–17 demonstrated good gloss, rub resistance, flexibility and adhesion to the substrate.

There are of course, many alternate embodiments and modifications which are intended to be included within the scope of the following claims.

What we claim is:

1. In a gravure ink composition comprising a colorant and vehicle, the improvement comprising employing a vehicle comprising a water-in-oil emulsion of a water immiscible organic solvent and water, said organic solvent and water being in a ratio of from 9:1 to 1:3 by weight, respectively.

2. The ink composition of claim 1 wherein said organic solvent and water are present in a ratio of from 9:1 to 1:1 by weight, respectively.

3. The ink composition of claim 2 wherein said composition has a viscosity of from 14s to 90s Shell Cup #2 at a temperature between 20° to 75° C.

4. The ink composition of claim 3 wherein said water immiscible organic solvent is selected from the group consisting of:
   (i) aromatic hydrocarbons having a single ring and a boiling point from 75° to 140° C.;
   (ii) aliphatic and cycloaliphatic hydrocarbons having a boiling point from 60° to 340° C.;
   (iii) esters of aliphatic acids having a boiling point from 65° to 175° C.;
   (iv) ketones having a boiling point from 75° to 180° C.;
   (v) alcohols having a boiling point from 100° to 260° C.;
   (vi) ethers having a boiling point from 100° to 210° C.;
   (vii) said water immiscible organic solvents from groups (i) to (vi) which are substituted with from 1 to 4 chloro or bromo substituents, and which have a boiling point of from 40° to 100° C.; and
   (viii) drying and semi-drying oils.

5. The ink composition of claim 1 wherein said organic solvent and water are present in a ratio of from 3:1 to 1.5:1 by weight, respectively.

6. The ink composition of claim 5 wherein said composition has a viscosity of from 16s to 50s Shell Cup #2 at a temperature between 20° to 75° C.

7. The ink composition of claim 6 wherein said water immiscible organic solvent is selected from the group consisting of:
   (i) aromatic hydrocarbons having a single ring and a boiling point from 75° to 140° C.;
   (ii) aliphatic and cycloaliphatic hydrocarbons having a boiling point from 60° to 340° C.;
   (iii) esters of aliphatic acids having a boiling point from 65° to 175° C.;
   (iv) ketones having a boiling point from 75° to 180° C.;
   (v) alcohols having a boiling point from 100° to 260° C.;
   (vi) ethers having a boiling point from 100° to 210° C.;
   (vii) said water immiscible organic solvents from groups (i) to (vi) which are substituted with from 1 to 4 chloro or bromo substituents, and which have a boiling point of from 40° to 100° C.;
   and wherein said organic solvents of groups (i) to (vii) have between 3 and 40 carbon atoms per compound.

8. The ink composition of claim 6 wherein said water immiscible organic solvent is selected from the group consisting of toluene, xylene, and $C_5$–$C_{40}$ aliphatic and cycloaliphatic hydrocarbons.

9. A gravure ink composition comprising by weight:
   (a) 2–25 parts colorant;
   (b) 5–35 parts resins;
   (c) 50–93 parts on a resin-free basis of a water-in-oil emulsion of a water immiscible organic solvent and water, said organic solvent and water being in a ratio of from 9:1 to 1:3, respectively; and
   (d) up to 15 parts of additives.

10. The ink composition of claim 9 wherein said organic solvent and water are present in a ratio of from 4:1 to 1.1:1 by weight, respectively.

11. The ink composition of claim 10 wherein said composition has a viscosity of from 14s to 90s Shell Cup #2 at a temperature between 20° to 75° C.

12. The ink composition of claim 11 wherein said water immiscible organic solvent is selected from the group consisting of:
   (i) aromatic hydrocarbons having a single ring and a boiling point from 75° to 140° C.;
   (ii) aliphatic and cycloaliphatic hydrocarbons having a boiling point from 60° to 340° C.;
   (iii) esters of aliphatic acids having a boiling point from 65° to 175° C.;
   (iv) ketones having a boiling point from 75° to 180° C.;
   (v) alcohols having a boiling point from 100° to 260° C.;
   (vi) ethers having a boiling point from 100° to 210° C.;
   (vii) said water immiscible organic solvents from groups (i) to (vi) which are substituted with from 1 to 4 chloro or bromo substituents, and which have a boiling point of from 40° to 100° C., and (viii) drying and semi-drying oils.

13. The ink composition of claim 12 wherein said organic solvent and water are present in a ratio of from 3:1 to 1.5:1 by weight, respectively.

14. The ink composition of claim 13 wherein said composition has a viscosity of from 16s to 50s Shell Cup #2 at a temperature between 20° to 75° C.

15. The ink composition of claim 14 wherein said water immiscible organic solvent is selected from the group consisting of:
(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acids having a boiling point from 65° to 175° C.;
(iv) ketones having a boiling point from 75° to 180° C.;
(v) alcohols having a boiling point from 100° to 260° C.;
(vi) ethers having a boiling point from 100° to 210° C.;
(vii) said water immiscible organic solvents from groups (i) to (vi) which are substituted with from 1 to 4 chloro or bromo substituents, and which have a boiling point of from 40° to 100° C.;
and wherein said organic solvents of groups (i) to (vii) have between 3 and 40 carbon atoms per compound.

16. The ink composition of claim 14 wherein said water immiscible organic solvent is selected from the group consisting of toluene, xylene, and $C_5$–$C_{40}$ aliphatic and cycloaliphatic hydrocarbons.

17. In a gravure printing process for transferring an ink composition to a substrate by contacting the substrate with a rotating engraved cylinder which is partially immersed in the ink composition, the ink composition comprising a colorant and a vehicle, wherein the improvement comprises employing a vehicle comprising a water-in-oil emulsion of a water immiscible organic solvent and water, said organic solvent and water being in the ratio of from 9:1 to 1:3 by weight, respectively.

18. The process of claim 17 wherein said organic solvent and water are present in a ratio of from 9:1 to 1:1 by weight, respectively.

19. The process of claim 18 wherein said ink composition is at a temperature between 20° to 75° C. and said composition has a viscosity of from 14s to 90s Shell Cup #2.

20. The process of claim 19 wherein said water immiscible organic solvent is selected from the group consisting of:
(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acids having a boiling point from 65° to 175° C.;
(iv) ketones having a boiling point from 75° to 180° C.;
(v) alcohols having a boiling point from 100° to 260° C.;
(vi) ethers having a boiling point from 100° to 210° C.;
(vii) said water immiscible organic solvents from groups (i) to (vi) which are substituted with from 1 to 4 chloro or bromo substituents, and which have a boiling point of from 40° to 100° C.; and (viii) drying and semi-drying oils.

21. The process of claim 17 wherein said organic solvent and water are present in a ratio of from 3:1 to 1.5:1 by weight, respectively.

22. The process of claim 18 wherein said ink composition is at a temperature between 20° to 75° C. and said composition has a viscosity of from 16s to 50s Shell Cup #2.

23. The process of claim 22 wherein said water immiscible organic solvent is selected from the group consisting of:
(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acids having a boiling point from 65° to 175° C.;
(iv) ketones having a boiling point from 75° to 180° C.;
(v) alcohols having a boiling point from 100° to 260° C.;
(vi) ethers having a boiling point from 100° to 210° C.;
(vii) said water immiscible organic solvents from groups (i) to (vi) which are substituted with from 1 to 4 chloro or bromo substituents, and which have a boiling point of from 40° to 100° C.;
and wherein said organic solvents of groups (i) to (vii) have between 3 and 40 carbon atoms per compound.

24. The process of claim 22 wherein said water immiscible organic solvent is selected from the group consisting of toluene, xylene, and $C_5$–$C_{40}$ aliphatic and cycloaliphatic hydrocarbons.

25. In a gravure printing process for transferring an ink composition to a substrate by contacting the substrate with a rotating engraved cylinder which is partially immersed in the ink composition, the improvement comprises employing an ink composition comprising by weight:
(a) 2–25 parts colorant;
(b) 5–35 parts resins;
(c) 50–93 parts on a resin-free basis of a water-in-oil emulsion of a water immiscible organic solvent and water, said organic solvent and water being in a ratio of from 9:1 to 1:3 by weight, respectively; and
(d) up to 15 parts of additives.

26. The process of claim 25 wherein said organic solvent and water are present in a ratio of from 4:1 to 1.1:1 by weight, respectively.

27. The process of claim 26 wherein said ink composition is at a temperature between 20° to 75° C. and said composition has a viscosity of from 14s to 90s Shell Cup #2.

28. The process of claim 27 wherein said water immiscible organic solvent is selected from the group consisting of:
(i) aromatic hydrocarbons having a single ring and a boiling point from 75° to 140° C.;
(ii) aliphatic and cycloaliphatic hydrocarbons having a boiling point from 60° to 340° C.;
(iii) esters of aliphatic acids having a boiling point from 65° to 175° C.;
(iv) ketones having a boiling point from 75° to 180° C.;
(v) alcohols having a boiling point from 100° to 260° C.;
(vi) ethers having a boiling point from 100° to 210° C.;
(vii) said water immiscible organic solvents from groups (i) to (vi) which are substituted with from 1 to 4 chloro or bromo substituents, and which have a boiling point of from 40° to 100° C.; and (viii) drying and semi-drying oils.

29. The process of claim 25 wherein said organic solvent and water are present in a ratio of from 3:1 to 1.5:1 by weight, respectively.

30. The process of claim 26 wherein said ink composition is at a temperature of 20° to 75° and said composition has a viscosity of from 16s to 50s Shell Cup #2.

31. The process of claim 30 wherein said water immiscible organic solvent is selected from:

(i) aromatic hydrocarbons having a single ring and a boiling point from 75° to 140° C.;

(ii) aliphatic and cycloaliphatic hydrocarbons having a boiling point from 60° to 340° C.;

(iii) esters of aliphatic acids having a boiling point from 65° to 175° C.;

(iv) ketones having a boiling point from 75° to 180° C.;

(v) alcohols having a boiling point from 100° to 260° C.;

(vi) ethers having a boiling point from 100° to 210° C.;

(vii) said water immiscible organic solvents from groups (i) to (vi) which are substituted with from 1 to 4 chloro or bromo substituents, and which have a boiling point of from 40° to 100° C.;

and wherein said organic solvents of groups (i) to (vii) have between 3 and 40 carbon atoms per compound.

32. The process of claim 30 wherein said water immiscible organic solvent is selected from the group consisting of toluene, xylene, and $C_5$–$C_{40}$ aliphatic and cycloaliphatic hydrocarbons.

* * * * *